(12) United States Patent
Inaguma

(10) Patent No.: US 7,740,263 B2
(45) Date of Patent: Jun. 22, 2010

(54) FRONT WHEEL SUPPORTING STRUCTURE

(75) Inventor: Hideo Inaguma, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 294 days.

(21) Appl. No.: 11/898,451

(22) Filed: Sep. 12, 2007

(65) Prior Publication Data

US 2008/0061527 A1 Mar. 13, 2008

(30) Foreign Application Priority Data

Sep. 13, 2006 (JP) .............................. 2006-248077

(51) Int. Cl.
*B62K 21/02* (2006.01)
(52) U.S. Cl. .................. 280/276; 280/279; 188/281
(58) Field of Classification Search .................. 280/276, 280/279; 188/281
See application file for complete search history.

(56) References Cited

U.S. PATENT DOCUMENTS

| | | | | |
|---|---|---|---|---|
| 1,494,135 | A * | 5/1924 | Robison et al. ............. | 188/287 |
| 6,592,136 | B2 * | 7/2003 | Becker et al. ............... | 280/276 |
| 6,739,609 | B2 * | 5/2004 | Miyabe ....................... | 280/276 |
| 6,883,650 | B2 * | 4/2005 | van Wonderen et al. ..... | 188/287 |
| 6,918,605 | B2 * | 7/2005 | Wada et al. .................. | 280/279 |
| 7,163,222 | B2 * | 1/2007 | Becker et al. ............... | 280/276 |
| 7,357,232 | B2 * | 4/2008 | Fujita .......................... | 188/297 |
| 7,425,009 | B2 * | 9/2008 | Namazue et al. ............ | 280/279 |
| 2002/0040833 | A1 * | 4/2002 | Furuya .................. | 188/322.22 |

FOREIGN PATENT DOCUMENTS

| | | |
|---|---|---|
| JP | 49-1162 | 1/1974 |
| JP | 51-41720 | 10/1974 |
| JP | 06-109054 | 4/1994 |
| JP | 2004-270743 | 9/2004 |
| JP | 2004270743 A * | 9/2004 |

* cited by examiner

*Primary Examiner*—Lesley Morris
*Assistant Examiner*—Michael R Stabley
(74) *Attorney, Agent, or Firm*—Rabin & Berdo, PC

(57) ABSTRACT

A front wheel supporting structure for a motorcycle (1) includes a pair of front forks (10, 20) provided on the right and left sides of a front wheel (2) for supporting the front wheel (2) to a frame (5) of the motorcycle (1). The front forks (10, 20) includes a first front fork (20) which generates a damping force for damping a vibration of the front wheel (2) depending on an amplitude of the vibration, and a second front fork (10) which generates a damping force for damping a vibration of the front wheel not depending on the amplitude of the vibration. By thus combining the front forks (10, 20) having different damping force characteristics, the front wheel supporting structure can absorb vibrations of various velocities and amplitudes.

7 Claims, 5 Drawing Sheets

FRONT WHEEL SUPPORTING STRUCTURE

FIELD OF THE INVENTION

This invention relates to a front wheel supporting structure of a motorcycle using a pair of front forks.

BACKGROUND OF THE INVENTION

Utility Model Publication S51-41720 (Jikko Syo 51-41720) published in 1976 by the Japan patent office discloses a front wheel supporting structure of a motorcycle using a pair of front forks. The one of the front forks is operated as an oil pressure shock absorber provided with a damping force generating mechanism for absorbing the vibration by the irregularities on the road surface, and a suspension spring for supporting a vehicle body elastically. The other of the front forks is operated as a guide cylinder at the time of elongation and contraction of the front forks.

Utility Model Publication S49-1162 (Jikko Syo 49-1162) published in 1974 by the Japan Patent Office discloses a pair of front forks one of which is served as an oil pressure shock absorber provided with a damping force generating mechanism and the other of which is served as a guide cylinder provided with a suspension spring.

JPH06-109054A published in 1992 by the Japan Patent Office discloses a front fork provided with a damping force generating mechanism for generating a damping force depending on the velocity of vibration and a damping force generating mechanism for generating a damping force depending on the amplitude of vibration.

SUMMARY OF THE INVENTION

The front wheel supporting structures according to Utility Model Publication S51-41720 and Utility Model Publication S49-1162 comprise only one front fork that is provided with the damping force generating mechanism. Therefore, when the velocity and the amplitude of the vibration exerted on the front fork vary depending on the driving state of the motorcycle, the vibration due to the irregularities of the road surface may not be absorbed sufficiently by these supporting structures.

Using a pair of the front forks disclosed in JPH06-109054A may improve the oscillation absorbing performance of the supporting structure, but it would incur the further cost as the front forks of the identically complicated construction have to be arranged on both sides of the front wheel.

It is therefore an object of this invention to provide a front wheel supporting structure capable of absorbing the vibration caused by the irregularities of the road surface irrespective of the velocity and the amplitude of the vibration, at a low cost.

In order to achieve the above object, this invention provides a front wheel supporting structure for a motorcycle, comprising a pair of front forks provided on the right and left sides of a front wheel of the motorcycle for supporting the front wheel to a frame of the motorcycle. One of the pair of the front forks comprises a first front fork which generates a damping force for damping a vibration of the front wheel depending on an amplitude of the vibration, and the other one of the pair of the front forks comprises a second front fork which generates a damping force for damping a vibration of the front wheel not depending on the amplitude of the vibration.

The details as well as other features and advantages of this invention are set forth in the remainder of the specification and are shown in the accompanying drawings.

DESCRIPTION OF THE PREFERRED EMBODIMENTS

Figure 1:
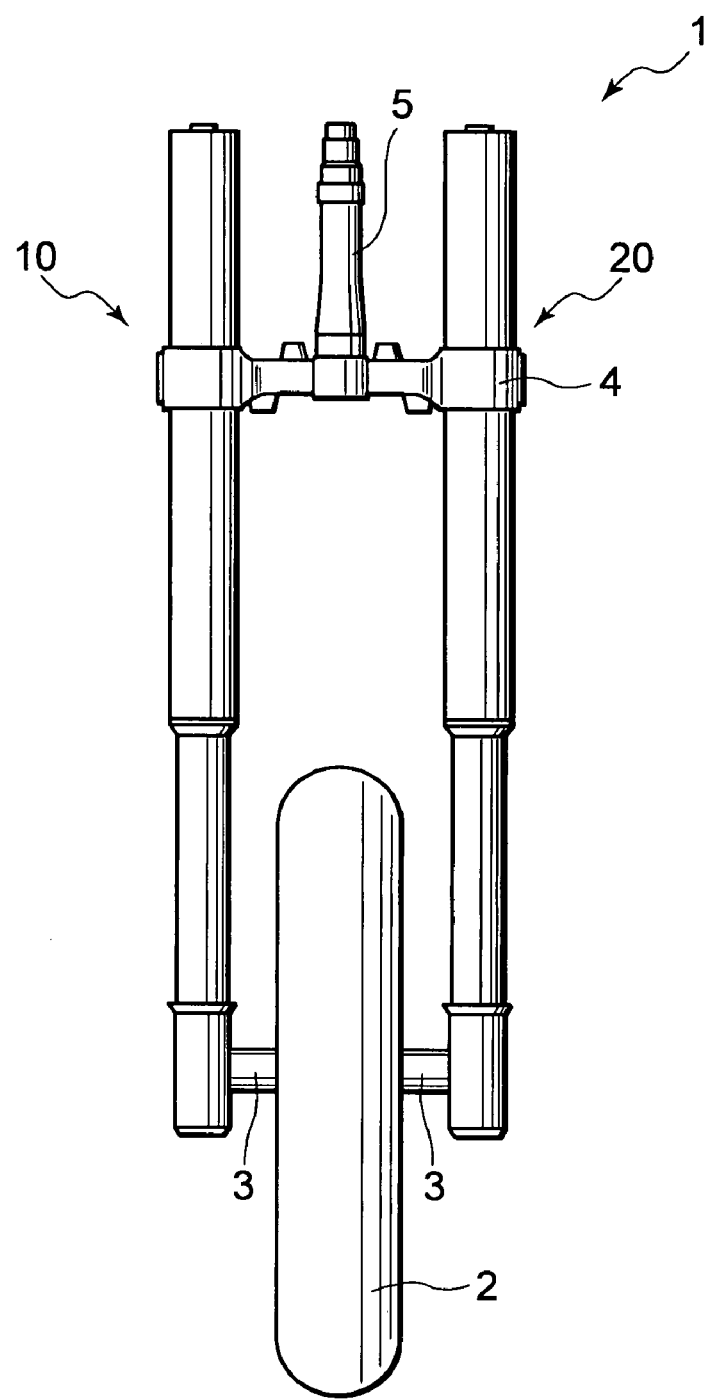
FIG. 1 is a back side view of a pair of front forks according to this invention arranged on the right and left sides of a front wheel of a motorcycle.

Referring to FIG. 1 of the drawings, a front wheel supporting structure of a motorcycle 1 comprises a left side front fork 10 disposed on the left side of a front wheel 2, and a right side front fork 20 disposed on the right side of the front wheel 2. The left side front fork 10 and the right side front fork 20 support a shaft 3 of the front wheel 2 at the lower end thereof. Upper ends of the left side front fork 10 and the right side front fork 20 are supported by a steering bracket 4. A steering shaft 5 is connected to the center of this steering bracket 4.

Each of the front forks 10, 20 functions as an oil pressure shock absorber absorbing the vibration caused by the irregularities of the road surface while the motorcycle 1 is running.

According to this invention, in order to sufficiently absorb the vibration which varies in accordance with the driving state of the motorcycle 1, a damping mechanism for generating a damping force depending only on the velocity of the vibration is provided in the left side front fork 10, and a damping mechanism for generating a damping force depending on the velocity and the amplitude of the vibration is provided in the right side front fork 20.

Figure 2:
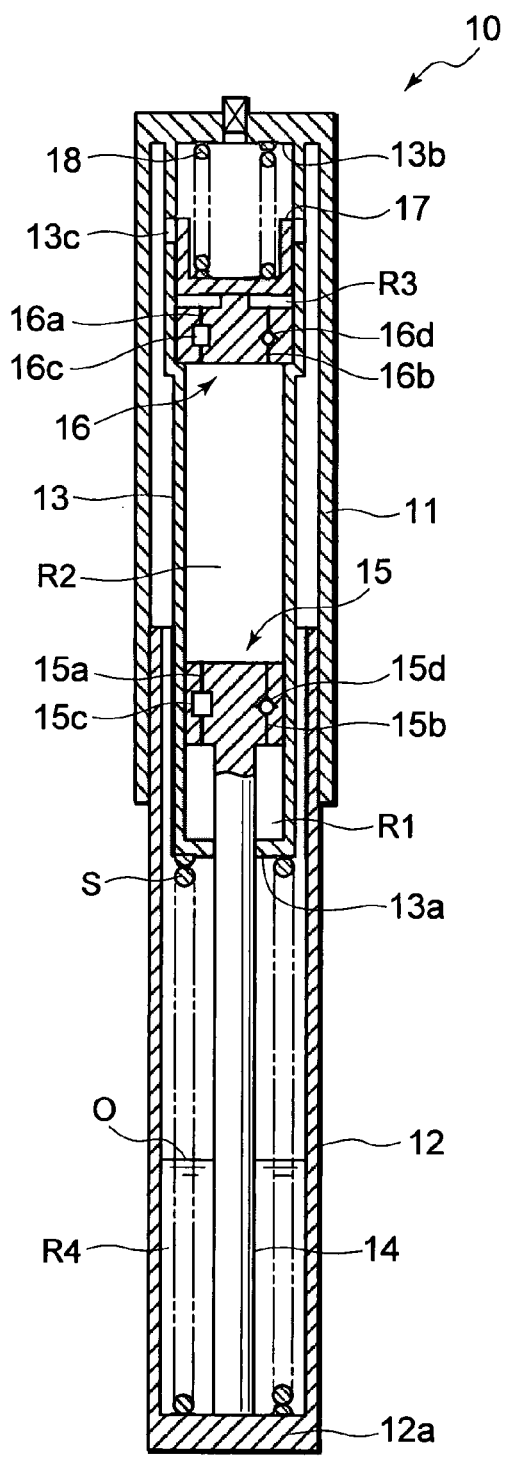
FIG. 2 is a schematic longitudinal sectional view of the left side front fork.

Referring to FIG. 2, the left side front fork 10 will be described.

The left side front fork 10 is provided with a frame side tube 11 and a wheel side tube 12. The wheel side tube 12 is inserted into the frame side tube 11 so as to be free slide along the inner circumference of the frame side tube 11.

A cylinder 13 projects downward in the frame side tube 11. Working oil is enclosed in the cylinder 13. Working oil is also enclosed in a reservoir R4 in the wheel side tube 12 up to an oil surface O in the figure.

A suspension spring S for biasing the frame side tube 11 and the wheel side tube 12 in an elongation direction is provided between a bottom 13a of the cylinder 13 and a bottom 12a of the wheel side tube 12.

In the wheel side tube 12, a rod 14 is fixed to the bottom 12a so as to project upward through the center of the cylinder 13. The rod 14 penetrates through the bottom 13a of the cylinder 13. A piston 15 is formed at an end of the rod 14 in the cylinder 13.

The piston 15 is housed in the cylinder 13 so as to be free to slide axially on the inner circumference of the cylinder 13. The piston 15 separates the interior of the cylinder 13 into a rod side oil chamber R1 and a piston side oil chamber R2. A first piston path 15a and a second piston path 15b for connecting the rod side oil chamber R1 and the piston side oil chamber R2 are formed through the piston 15. An elongation stroke damping valve 15c comprising for example a leaf valve is installed in the first piston path 15a. A check valve 15d preventing working oil from flowing from the rod side oil chamber R1 to the piston side oil chamber R2 is installed in the second piston path 15b.

The elongation damping valve 15c is constructed so as to open and close the first piston path 15a depending on a flow direction and pressure of the working oil. The working oil in the piston side oil chamber R2 is prevented from flowing into the rod side oil chamber R1 through the first piston path 15a by the elongation stroke damping valve 15c. On the other hand, when the pressure of the working oil in the rod side oil chamber R1 has become greater than a predetermined value, the elongation stroke damping valve 15c opens and allows the working oil in the rod side oil chamber R1 to flow into the piston side oil chamber R2 through the first piston path 15a. A resistance is caused when the working oil passes through the elongation stroke damping valve 15c, thereby generating a damping force in the elongation stroke of the front fork 10. As the flow velocity of the working oil passing through the elongation stroke damping valve 15c increases, the damping force generated by the elongation stroke damping valve 15c becomes greater.

The working oil in the rod side oil chamber R1 is prevented by the check valve 15d from flowing into the piston side oil chamber R2 through the second piston path 15b. In contrast, the check valve 15d allows the working oil in the piston side oil chamber R2 to flow into the rod side oil chamber R1 through the second piston path 15b.

A base valve 16 and a free piston 17 are arranged in the upper part of the cylinder 13 and a base valve side oil chamber R3 is formed between the base valve 16 and the free piston 17 in the cylinder 13. The base valve side oil chamber R3 is filled with working oil.

The base valve 16 is fixed to the inner circumference of the cylinder 13. The base valve 16 comprises a first base valve path 16a and a second base valve path 16b for connecting the piston side oil chamber R2 and the base valve side oil chamber R3. A contraction stroke damping valve 16c comprising for example a leaf valve is installed in the first base valve path 16a. A check valve 16d preventing working oil flowing from the piston side oil chamber R2 to the base valve side oil chamber R3 is installed in the second base valve path 16b.

The contraction stroke damping valve 16c is constructed so as to open and close the first base valve path 16a depending on a flow direction and pressure of the working oil.

The working oil in the base valve side oil chamber R3 is prevented by the contraction stroke damping valve 16c from flow into the piston side oil chamber R2 through the first base valve path 16a. On the other hand, when the pressure of the working oil in the piston side oil chamber R2 has become greater than a predetermined value, the contraction stroke damping valve 16c opens and allows the working oil in the piston side oil chamber R2 to flow into the base valve side oil chamber R3 through the first base valve path 16a. A resistance is caused when the working oil is passing through the contraction stroke damping valve 16c, thereby generating a damping force in the contraction stroke of the front fork 10. As the flow velocity of the working oil passing through the contraction stroke damping valve 16c increases, the damping force generated by the contraction stroke damping valve 16c becomes greater.

The working oil in the piston side oil chamber R2 is prevented by the check valve 16d from flowing into the base valve side oil chamber R3 through the second base valve path 16b. In contrast, the check valve 16d allows the working oil in the base valve side oil chamber R3 to flow into the piston side oil chamber R2 through the second base valve path 16b.

The free piston 17 is disposed above the base valve 16 in the cylinder 13 so as to be free to slide axially on the inner circumference of the cylinder 13. A spring 18 for biasing the free piston 17 towards the base valve 16 is arranged between the free piston 17 and an upper end 13b of the cylinder 13. The free piston 17 is thereby operated as a pressurizing device for pressurizing the working oil in the cylinder 13. Since a constant pressure is applied to the working oil in the cylinder 13 by the free piston 17, the damping forces generated respectively in the contraction stroke and the elongation stroke of the left side front fork 10 are stabilized.

A communicating hole 13c penetrates the wall of the cylinder 13 on which the free piston 17 slides axially. The communicating hole 13c opens onto the base valve side oil chamber R3 when the free piston 17 moves towards the upper end 13b of the cylinder 13 beyond a predetermined position. When the communicating hole 13c is open, the base valve side oil chamber R3 communicates with the reservoir chamber R4 which is defined by the frame side tube 11 and the wheel side tube 12 outside the cylinder 13.

In the left side front fork 10 constructed as described above, when the frame side tube 11 and the wheel side tube 12 contract, the piston 15 moves upward in the cylinder 13, therefore the piston side oil chamber R2 contracts and the rod side oil chamber R1 enlarges. As a result, the working oil in the piston side oil chamber R2 flows into the enlarged rod side oil chamber R1 through the second piston path 15b. Further, the working oil of the volume corresponding to the volume of the rod 14 entered into the cylinder 13 flows into the base valve side oil chamber R3 through the first base valve path 16a. Since the second base valve path 16b is closed by the check valve 16d, the working oil in the piston side oil chamber R2 does not flow into the base valve side oil chamber R3 via the second base valve path 16b.

During the contraction stroke of the left side front fork 10, the contraction stroke damping force is generated as the working oil passes through the contraction stroke damping valve 16c in the first base valve path 16a. Therefore, the left side front fork 10 can absorb moderate and minute vibrations. Further, since the damping force generated by the contraction stroke damping valve 16c becomes greater as the contraction stroke speed of the piston 15 increases, the left side front fork 10 can also absorb high frequency vibrations.

When the piston 15 moves further upward in the cylinder 13, the working oil of the piston side oil chamber R2 flows into the base valve side oil chamber R3, and the pressure of the working oil in the base valve side oil chamber R3 increases. As a result, the free piston 17 moves upward towards the upper end face 13b, and the working oil of the volume corresponding to the volume of the rod 14 entered into the cylinder 13 is compensated for. When the working oil in the reservoir chamber R4 flows into the cylinder 13 through a gap between the rod 14 and the bottom 13a, the volume of the working oil in the cylinder 13 increases. In this instance, as the free piston 17 moves upward beyond the predetermined position, the communicating hole 13c opens onto the base valve side oil chamber R3. The excess working oil in the base valve side oil chamber R3 flows out to the reservoir chamber R4 through the communicating hole 13c. Thus, the defects such as a breakage of a sealing part due to an excessively high pressure in the base valve side oil chamber R3 can be prevented.

On the other hand, when the piston 15 moves downward inside the cylinder 13 due to the elongation stroke of the frame side tube 11 and the wheel side tube 12, the downwardly moving piston 15 decreases the capacity of the rod side oil chamber R1 and the working oil in the rod side oil chamber R1 flows into the enlarged piston side oil chamber R2 via the elongation stroke damping valve 15c, generating an elongation stroke damping force.

Herein, the check valve 15d closes the second piston path 15b, and hence the whole amount of working oil flowing from the rod side oil chamber R1 to the piston side oil chamber R2 passes through the first piston path 15a, which is provided with the elongation stroke damping valve 15c. Therefore, the left side front fork 10 can absorb moderate and minute vibrations. Further, since the damping force generated by the elongation stroke damping valve 15c becomes greater as the elongation stroke speed of the piston 15 increases, the left side front fork 10 can also absorb high frequency vibrations.

As described above, in the left side front fork 10, since the damping force becomes greater as the moving speed of the piston 15 increases, the vibration caused by the irregularities of the road surface can be absorbed irrespective of the vibration velocity.

Next, referring to FIG. 3, the right side front fork 20 will be described.

The right side front fork 20 is provided with a frame side tube 21 and a wheel side tube 22. The wheel side tube 22 is inserted into the frame side tube 21 so as to be free to slide along the inner circumference of the frame side tube 21.

A cylinder 23 is formed in the wheel side tube 22 so as to project upward from a bottom 23g. Communicating holes 23a to 23e are provided in the wall of the cylinder 23 at predetermined intervals in the axial direction. These communicating holes 23a to 23e connect the interior of the cylinder 23 and a reservoir chamber R4 which is defined by the frame side tube 21 and the wheel side tube 22 outside the cylinder 23.

The communicating holes 23a are formed in the vicinity of the upper end 23f of the cylinder 23. Among the communicating holes 23a to 23e, the communicating holes 23e are the lowest ones located at a position in some distance from the bottom 23g of the cylinder 23.

A suspension spring S for biasing the frame side tube 21 and the wheel side tube 22 in the elongation direction is arranged in the frame side tube 21 between the upper end 23f of the cylinder 23 and the upper end 21a of the frame side tube 21.

In the frame side tube 21, a rod 24 is fixed to the upper end 21a so as to project downward through the center of the cylinder 23. The rod 24 penetrates the upper end 23f of the cylinder 23. A piston 25 is fixed to the tip of the rod 24 in the cylinder 23.

The piston 25 slides on the inner circumference of the cylinder 23 in the axial direction. The piston 25 separates the interior of the cylinder 23 into a rod side oil chamber R1 and a piston side oil chamber R2. The rod side oil chamber R1 and the piston side oil chamber R2 are filled with working oil. The working oil stored in the reservoir chamber R4 compensates for the variation in the oil volume in the oil chambers R1, R2. The amount of the working oil in the reservoir chamber R4 is set such that the upper end 22a of the wheel side tube 22 is immersed in the working oil, as illustrated by the oil surface O in the figure.

The piston 25 has a check valve 26 which closes in the contraction stroke of the right side front fork 20. In other words, the working oil in the piston side oil chamber R2 is prevented from flowing into the rod side oil chamber R1 by the check valve 26. In contrast, the working oil in the rod side oil chamber R1 is allowed to flow into the piston side oil chamber R2 through the check valve 26.

Further, a check valve 27 is provided in a cylinder body forming the lower end 23g of the cylinder 23. The working oil in the piston side oil chamber R2 is prevented from flowing into the reservoir chamber R4 by this check valve 27. In contrast, the working oil in the reservoir chamber R4 is allowed to flow into the piston side oil chamber R2 through the check valve 27.

Figure 4:
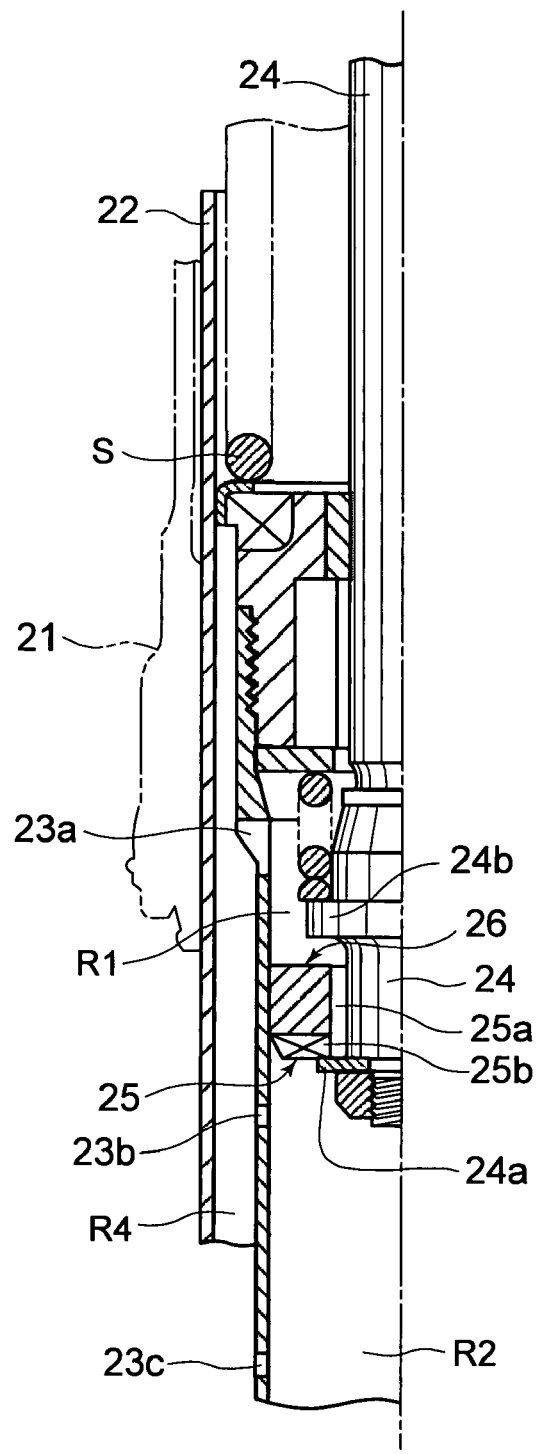
FIG. 4 is a longitudinal sectional view of a piston of the right side front fork.

Referring to FIG. 4, the composition of the check valve 26 will be described.

The rod 24 has a disc-shaped first stopper 24a at its end, and a second stopper 24b at a position away from the first stopper 24a in the axial direction.

The piston 25 is ring-shaped, and is interposed the outer periphery of the rod 24 between the first stopper 24a and the second stopper 24b. Thus, the piston 25 is capable of moving between the first stopper 24a and the second stopper 24b along the axis of the rod 24. The inner diameter of the piston 25 is set to be larger than the outer diameter of the rod 24, and hence a clearance gap 25a is formed between the piston 25 and the rod 24. Further, the piston 25 is provided with a communicating path 25b facing a first stopper 24a for connecting the clearance gap 25a and the piston side oil chamber R2. The communicating path 25b may be a groove formed radially in the lower face of the piston 25.

By constructing the piston 25 as described above, the piston 25 functions as the check valve 26. Specifically, in the elongation stroke of the front fork 20 which the rod 24 is withdrawn from the interior of the cylinder 23, the piston 25 is seated on the first stopper 24a of the rod 24. In this state, the working oil in the rod side oil chamber R1 is allowed to flow into the piston side oil chamber R2 through the clearance gap 25a and communicating path 25b of the piston 25.

In contrast, in the contraction stroke during which the rod 24 enters into the cylinder 23, the piston 25 is seated on the second stopper 24b. In this state, since the clearance gap 25a is closed by the second stopper 24b, the working oil in the piston side oil chamber R2 is prevented from flowing into the rod side oil chamber R1.

Figure 5:
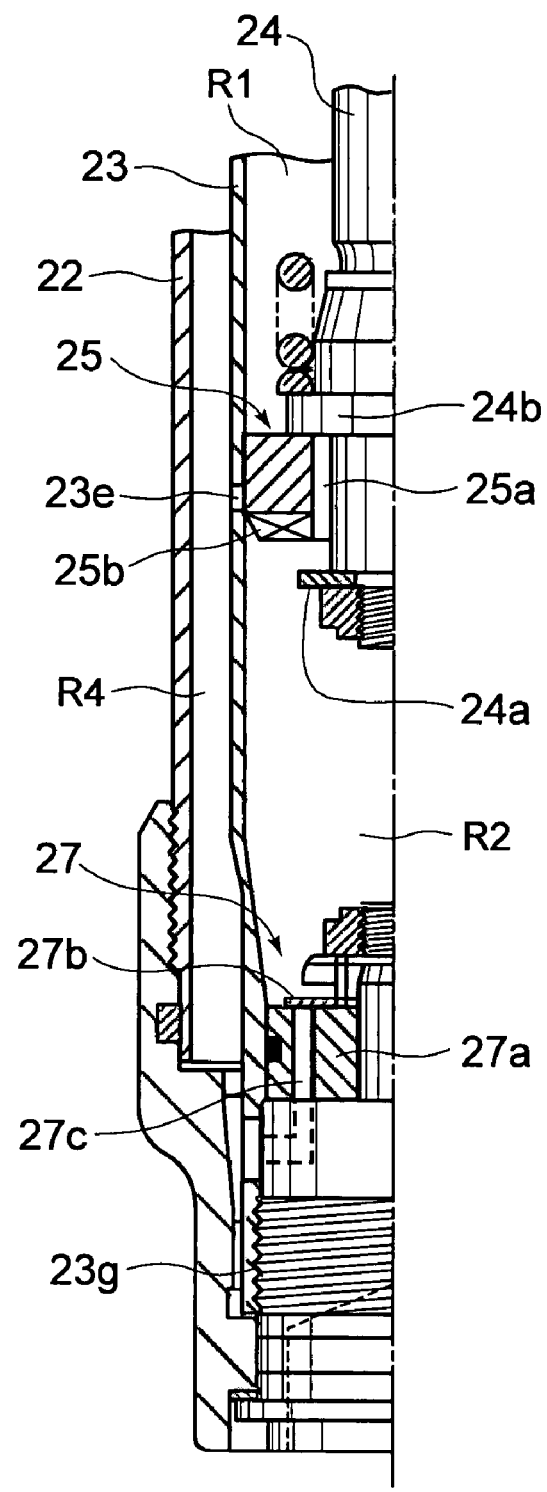
FIG. 5 is a longitudinal sectional view of a contracting side check valve provided below a cylinder of the right side front fork.

Referring to FIG. 5, the composition of the check valve 27 win be described.

The check valve 27 provided at the lower end 23g of the cylinder 23 comprises a valve seat 27a and a leaf valve 27b.

The valve seat 27a is fixed to the cylinder 23. The valve seat 27a has a communicating path 27c for communicating the reservoir chamber R4 and the piston side oil chamber R2. The leaf valve 27b is a ring-shaped plate member, and closes the communicating path 27c elastically.

In the elongation stroke of the front fork 20 in which the rod 24 is withdrawn from the interior of the cylinder 23, the leaf valve 27b deforms upward to open the communicating path 27b, and the working oil in the reservoir chamber R4 flows into the piston side oil chamber R2 through the communicating path 27c.

In contrast, in the contraction stroke of the front fork 20 in which the rod 24 enters into the cylinder 23, the communicating path 27c is closed by the leaf valve 27b seated on the valve seat 27a. In this state, the working oil in the piston side oil chamber R2 is prevented from flowing into the reservoir chamber R4.

In the right side front fork 20 constructed as described above, in the contraction stroke in which the piston 25 enters into the interior of the cylinder 23, the working oil is prevented from flowing out from the piston side oil chamber R2 by the check valve 26 and the check valve 27. As a result, the pressure in the piston side oil chamber R2 increases and the working oil of the volume corresponding to the volume of the contracting piston side oil chamber R2 flows into the reservoir chamber R4 through the communicating holes 23b-23e. Further, the working oil in the reservoir chamber R4 flows into the enlarged rod side oil chamber R1 through the communicating holes 23a-23d above the piston 25. A resistance when the working oil in the piston side oil chamber R2 flows into the reservoir chamber R4 through the communicating holes 23b-23e, brings about a damping force in the contraction stroke of the front fork 20. As the piston 25 strokes further in the cylinder 23, the number of the communicating holes 23a-23e allowing the working oil in the piston side oil chamber R2 to flow into the reservoir chamber R4 decreases. As a result, the pressure in the piston side oil chamber R2 increases and the resistance to the working oil passing through the communicating holes 23b-23e also increases, thereby increasing the damping force depending on the stroke position of the piston 25. In addition, the damping force increases as the stroke speed of the piston 25 becomes faster.

Figure 3:
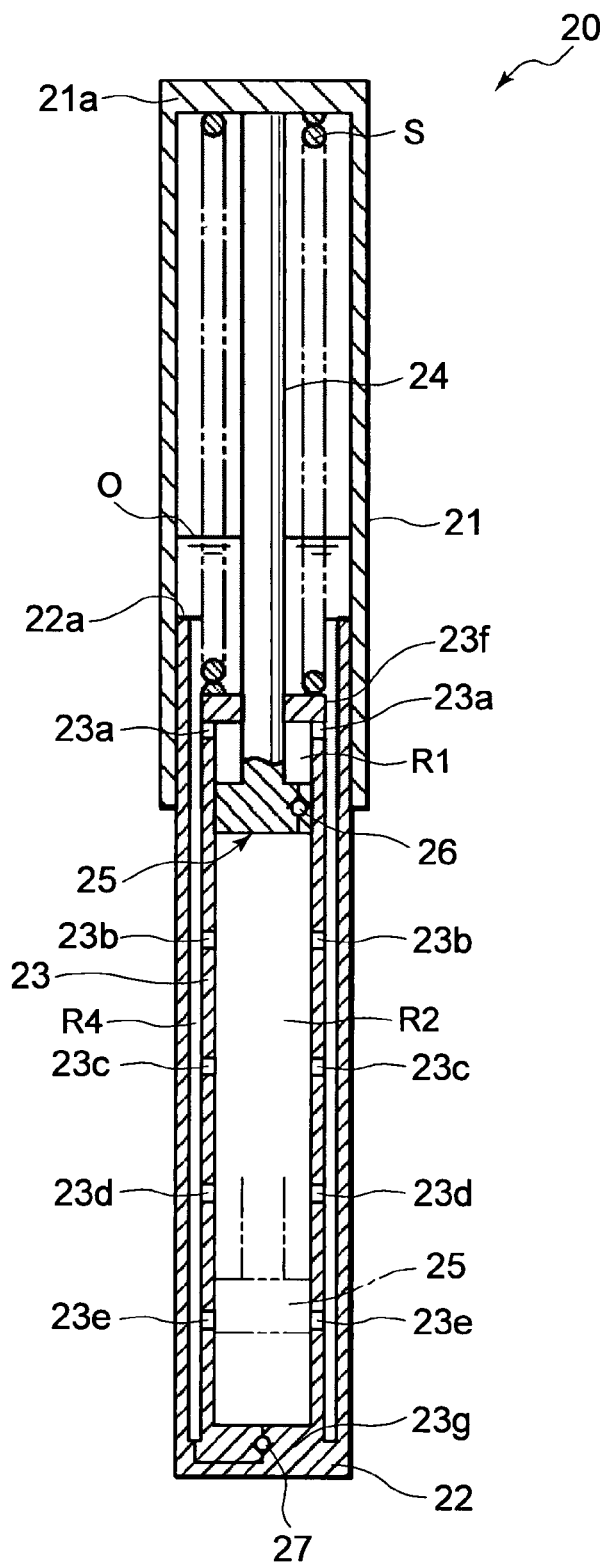
FIG. 3 is a schematic longitudinal sectional view of the right side front fork.

When the piston 25 reaches a position illustrated by a dotted line in FIG. 3, the communicating holes 23e are closed, and the working oil in the piston side oil chamber R2 becomes unable to flow out to the reservoir chamber R4. In other words, the working oil is sealed between the piston 25 and the cylinder 23 which prevents the piston 25 from further stroking downward from this position. This state of the piston 25 is so-called an oil-lock state.

On the other hand, in the elongation stroke of the front fork 20 in which the piston 25 is lifted up in the cylinder 23, the working oil in the rod side oil chamber R1 flows into the piston side oil chamber R2 without resistance through the check valve 26, i.e., the clearance gap 25a and the communicating path 25b. At the same time, the working oil in the reservoir chamber R4 is introduced into the piston side oil chamber R2 without resistance through the check valve 27. As described above, the right side front fork 20 is constructed such that the pressure of the working oil in the rod side oil chamber R1 does not increase in the elongation stroke, and hence only a small damping force is generated in the elongation stroke.

It should be noted that, in the right side front fork 20, the damping force in the contraction stroke increases as the piston 25 advances further downward. In other words, the damping force in the contraction stroke of the right side front fork 20 depends also on the stroke position of the piston 25.

As described above, among the pair of the front forks 10, 20, the left side front fork 10 generates the damping force depending only on the velocity of the vibration, and the right side front fork 20 generates damping force depending on the velocity of the vibration as well as on the amplitude thereof. The combination of the right and the left front forks 10, 20 having different damping force characteristics enable the front fork supporting structure to absorb vibrations of various velocity and amplitude dependent on the driving state of the motorcycle 1, even when the motorcycle 1 is driven under a wide driving range from a slow speed range to a high speed range. As a result, the riding quality of the motorcycle 1 can be improved.

Further, the front wheel supporting structure described above uses the left side front fork 10 and the right side front fork 20 of different construction. The construction of the front fork of the aforesaid JPH06-109054A is more complicated and the cost of the one is higher than that of the left side front fork 10 or the right side front fork 20. The implementation cost of this front wheel supporting structure is therefore less than that for implementing a supporting structure comprising a pair of the identical front forks of the prior art.

The contents of Tokugan 2006-248077, with a filing date of Sep. 13, 2006 in Japan, are hereby incorporated by reference.

Although the invention has been described above with reference to certain embodiments of the invention, the invention is not limited to the embodiments described above. Modification and variation of the embodiments described above will occur to those skilled in the art, within the scope of the claims.

For example, the above embodiment is described with respect to the motorcycle 1 provided with the pair of the front forks 10, 20, but this invention may also be applied to a front wheel supporting structure of a bicycle.

The left side front fork 10 may be constructed as an upright type in which the frame side tube 11 is inserted into the wheel side tube 12. Similarly, the right side front fork 20 may be constructed as an upright type in which the frame side tube 21 is inserted into the wheel side tube 22.

Further, in the left side front fork 10, the cylinder 13 may be provided as a part of the wheel side tube 12, while the rod 14 and the piston 15 are provided as a part of the frame side tube 11.

In the left side front fork 10, the elongation stroke side damping valve 15c is disposed in the first piston path 15a. However, by constructing the first piston path 15a in the form of an orifice or chalk, the elongation stroke damping valve 15c may be omitted. Similarly, the contraction stroke damping valve 16c may be omitted by constructing the first base valve path 16a in the form of an orifice or chalk.

What is claimed is:

1. A front wheel supporting structure for a motorcycle, comprising a pair of front forks provided on the right and left sides of a front wheel of the motorcycle for supporting the front wheel to a frame of the motorcycle, wherein the pair of the front forks comprises:
   a first front fork which generates a damping force for damping a vibration of the front wheel depending on an amplitude of the vibration; and
   a second front fork which generates a damping force for damping a vibration of the front wheel not depending on the amplitude of the vibration, wherein
   an end of the first front fork is connected to the frame, and the other end of the first front fork is connected to a shaft of the front wheel, such that the first front fork elongates and contracts according to the vibration of the front wheel; and
   the first front fork includes a damping force generating mechanism which generates a damping force when the first front fork contracts, the damping force generating mechanism including:
   a cylinder,
   a piston which separates an interior of the cylinder into a rod side oil chamber and a piston side oil chamber, and is slidable in the cylinder in a direction for reducing the piston side oil chamber formed in the cylinder as the first front fork contracts,
   a plurality of through-holes formed through a wall of the cylinder for allowing working oil with which the piston side oil chamber is filled to flow out from the piston side oil chamber, the through-holes being disposed along a sliding direction of the piston such that a number of the through-holes on the piston side oil chamber decreases as the piston reduces the piston side oil chamber; and
   a check valve which prevents the working oil from flowing into the rod side oil chamber from the piston side oil chamber, and allows the working oil to flow into the piston side oil chamber from the rod side oil chamber, such that only a small damping force is generated in an elongation stroke.

2. The front wheel supporting structure as defined in claim 1, wherein the first front fork is configured to generate a greater damping force as the amplitude of the vibration increases.

3. The front wheel supporting structure as defined in claim 1, wherein the first front fork is configured to generate the damping force depending on the velocity and the amplitude of the vibration, whereas the second front fork is configured to generate the damping force depending only on the velocity of the vibration.

4. The front wheel supporting structure as defined in claim 1, wherein
an end of the second front fork is connected to the frame whereas the other end of the second front fork is connected to the shaft of the front wheel, such that the second front fork elongates and contracts according to the vibration of the front wheel; and
the second front fork comprises a contraction stroke damping force generating mechanism which generates a damping force when the second front fork contracts, and an elongation stroke damping force generating mechanism which generates a damping force when the second front fork elongates.

5. The front wheel supporting structure as defined in claim 1, wherein the check valve is disposed on the piston of the first front fork.

6. The front wheel supporting structure as defined in claim 1, wherein the damping force generating mechanism further includes a check valve which prevents the working oil in the piston side oil chamber from flowing out while allowing the working oil to flow into the piston side oil chamber from outside.

7. A front wheel supporting structure for a motorcycle, comprising:
first and second front forks respectively provided on right and left sides of a front wheel of the motorcycle for supporting the front wheel to a frame of the motorcycle, an end of the first front fork being connected to the frame, the other end thereof being connected to a shaft of the front wheel, the first front fork including a damping force generating mechanism which generates a damping force when the first front fork contracts, the damping force generating mechanism including:
a cylinder,
a piston separating an interior of the cylinder into a rod side oil chamber and a piston side oil chamber, and being slidable in the cylinder for reducing the piston side oil chamber as the first front fork contracts,
a plurality of through-holes formed through a wall of the cylinder for allowing working oil to flow out from the piston side oil chamber, the through-holes being disposed along a sliding direction of the piston, such that a number of the through-holes on the piston side oil chamber decreases as the piston reduces the piston side oil chamber, and
a check valve preventing the working oil from flowing into the rod side oil chamber from the piston side oil chamber, and allowing the working oil to flow into the piston side oil chamber from the rode side oil chamber, such that only a small damping force is generated in an elongation stroke, such that the first front fork generates a first damping force for damping a vibration of the front wheel depending on an amplitude of the vibration, and the second front fork generates a second damping force for damping a vibration of the front wheel not depending on the amplitude of the vibration.

\* \* \* \* \*